(12) United States Patent  
Papadopoulos

(10) Patent No.: US 8,291,701 B2  
(45) Date of Patent: Oct. 23, 2012

(54) SYSTEM FOR GENERATING ELECTRICAL POWER AND POTABLE WATER FROM SEA WAVES

(75) Inventor: Christos F. Papadopoulos, Athens (GR)

(73) Assignee: Eocean Renewables Limited (GB)

( * ) Notice: Subject to any disclaimer, the term of this patent is extended or adjusted under 35 U.S.C. 154(b) by 795 days.

(21) Appl. No.: 12/519,921

(22) PCT Filed: Dec. 18, 2007

(86) PCT No.: PCT/EP2007/064152
§ 371 (c)(1),
(2), (4) Date: Jun. 18, 2009

(87) PCT Pub. No.: WO2008/074810

PCT Pub. Date: Jun. 26, 2008

(65) Prior Publication Data
US 2010/0043424 A1    Feb. 25, 2010

(30) Foreign Application Priority Data

Dec. 18, 2006  (GR) .................................. 060100687

(51) Int. Cl.
*F16D 31/02*    (2006.01)
*F03C 1/00*     (2006.01)
(52) U.S. Cl. ................. 60/398; 60/497; 60/504; 60/505
(58) Field of Classification Search ............. 60/398, 60/497, 504, 505; 290/42, 53
See application file for complete search history.

(56) References Cited

U.S. PATENT DOCUMENTS

| 4,410,304 | A  |   | 10/1983 | Bergloff et al. |
| 4,512,886 | A  |   | 4/1985  | Hicks et al. |
| 4,674,281 | A  | * | 6/1987  | Kim et al. ................. 60/496 |
| 5,701,740 | A  |   | 12/1997 | Tveter |
| 6,575,712 | B1 | * | 6/2003  | Slavchev ................. 417/331 |
| 7,781,903 | B2 | * | 8/2010  | Buffard et al. .............. 290/42 |
| 2006/0242954 | A1 | | 11/2006 | Welch, Jr. |

FOREIGN PATENT DOCUMENTS

| AU | 2005100648 A4 | 9/2005 |
| DE | 2214298       | 9/1973 |
| GR | 1004092 B1    | 12/2002 |
| GR | 1005120 B2    | 2/2006 |
| JP | 9-122644 A    | 5/1997 |
| JP | 2003-176775 A | 6/2003 |
| WO | 2005/045242 A1 | 5/2005 |
| WO | 2005/108778 A1 | 11/2005 |
| WO | 2006/085123 A1 | 8/2006 |

OTHER PUBLICATIONS

International Search Report for PCT/EP2007/064152.

* cited by examiner

*Primary Examiner* — Hoang Nguyen
(74) *Attorney, Agent, or Firm* — Brooks Kushman P.C.

(57) ABSTRACT

The invention pertains to a device and method for generation of electrical power from sea waves, with either simultaneous or no desalination of seawater. The device comprises a seaborne portion and a shore-side portion. The seaborne portion of the device comprises a float, an anchor and a pumping mechanism. Seawater and air are drawn in and pumped through pipes and respectively to a shore-side compressor system. The compressor system is adapted to provide pressurized water of constant pressure to the next stage, which is either the desalination assembly through which potable water is produced using the reverse-osmosis method or the water-motor, which drives a generator that provides electrical power or both.

23 Claims, 3 Drawing Sheets

SYSTEM FOR GENERATING ELECTRICAL POWER AND POTABLE WATER FROM SEA WAVES

The present invention pertains to a system for the generation of electrical power and potable water from sea waves. More specifically, the present invention pertains to a system for producing a flow of water having a substantially constant pressure from wave.

One of the greatest challenges that humankind faces is supplying its electrical power needs in the future. The various resources are continuously depleting while the pollution of the environment, also due to the uncontrolled use of electrical power, continuously creates new, almost insurmountable problems.

Moreover, the problem of potable water shortage faced in many regions of the world is well known. In Greece, for example, the extended complex of the Aegean Sea islands frequently faces the problem of a lack of potable water.

Both problems often go in hand since the generation of potable water, at least in areas that do not have sufficient fresh water supplies, often requires large amounts of power. One method for the generation of potable water is, for example, the desalination of seawater, which requires provision of a constant high water pressure to drive reverse-osmosis, said high water pressure generally being produced by high power pumps.

People continuously conduct experiments on alternative and cleaner forms of power production. The power contained in sea waves has for many years been an object of research and experimentation in order to find the most expedient method of utilizing it.

The higher and longer a sea wave is, the larger is the power it conveys; and since it is known that oceans cover the largest part of our planet sea waves can become an immense power source. Calculations have shown that sea waves encompass a huge and, for the time being, mostly unexploited power potential in the order of $10^8$-$10^{10}$ MW.

The greatest challenge as regards the technical exploitation of the power of sea waves and its conversion into a useful form is their irregular and random character. All relevant inventions and constructions presented to date have the form of bulky mechanical structures with insurmountable technical problems, such as mooring stability, resistance to wave collisions, and the requirement of special electric machinery for the generation and transmission of electric energy to the shore. Such structures also create ecological problems and constitute a risk for ship navigation.

An object of this invention is to provide a system for producing power from sea waves that overcomes the problems of the prior art and which, in particular, is able to operate under various sea surge conditions, without any risk of being destroyed and also with the ability to perform well even when the waves are small.

Another object of this invention is to provide a system for producing power from sea waves that is adapted for being used in desalinating seawater, for example, by reverse-osmosis.

These objects are solved by a system for producing a flow of water having a substantially constant pressure from waves according to claim 1. Preferred uses of the system according to claim 1 are given in claims 22 and 23. The dependent claims refer to preferred embodiments of the invention.

Accordingly, a system for producing a flow of water having a substantially constant pressure from waves comprises at least one pumping assembly being adapted to provide simultaneously a pressurized flow of air and a pressurized flow of water from substantially vertical movements of a float, at least one compressor assembly in which at least a first piston is movably located between a first air chamber and a first water chamber, said first air chamber being supplied by said pressurized flow of air from the pumping device and said first water chamber being supplied by said pressurized flow of water from the pumping device and at least one first controllable inlet valve, which is connected to said first water chamber and through which said pressurized water flows into said first water chamber upon opening of said first inlet valve and wherein said first inlet valve is closed as the first piston reaches a topmost position.

In a preferred embodiment, in a system according to the invention the compressor assembly further comprises a second piston movably located between a second air chamber and a second water chambers, said second air chamber also being supplied by said pressurized flow of air from the pumping device and said second water chamber being supplied by said pressurized flow of water from the pumping device and wherein at least one second controllable inlet valve is connected to said second water chamber through which said pressurized water flows into said second water chamber upon opening of said second inlet valve and said second inlet valve is closed as the second piston reaches a topmost position.

Preferably, in a system according to the invention, said first or second inlet valves are opened as the first or second pistons reach a lowest position, respectively.

In another preferred embodiment of system according to the invention, said second or first inlet valves are opened as the first or second pistons reach a topmost position, respectively, and/or said second or first inlet valves are closed as the first or second pistons reach a lowest position, respectively.

In another preferred embodiment of the invention, a controllable first outlet valve is connected to said first water chamber and water flows out of said first water chamber upon opening of said first outlet valve, said first outlet valve being opened as the first piston reaches a topmost position. Likewise, in an embodiment where a controllable second outlet valve is connected to said second water chamber, water flows out of said second water chamber upon opening of said second outlet valve and said second outlet valve being opened as the second piston reaches a topmost position.

In a preferred embodiment having first and/or second outlet valves, said first or second outlet valves are closed as the first or second pistons reach a lowest position. Similarly, it may be preferable to open said second or first outlet valves as the first or second pistons reach a lowest position, respectively, and/or to close said second or first outlet valves as the first or second pistons reach a topmost position, respectively.

Most preferably, in system according to the present invention the pumping assembly is immersed in water and held in position by an anchor, wherein, preferably, the pumping assembly is floating at a defined depth between an anchor and said float.

In a preferred embodiment of a system, according to the invention, the pumping assembly comprises first and second pumping pistons movable inside first and second cylinders and the pumping pistons are attached to the float and the cylinders are attached to the anchor. In such system, preferably, the first pumping piston, upon its reciprocating motion, draws water in and pushes water out of a pump chamber inside the first cylinder and/or the second pumping piston, upon its reciprocating motion, draws air in and pushes air out of a pump chamber inside the second cylinder.

Preferably, at least one recuperating spring is provided so as to partially or fully support at least one direction of movement of said pumping piston.

Preferably, at least one one-way inlet valve is connected to the pump chamber of said cylinder so as to allow drawing water or air into the respective pump chamber by the piston and/or at least one one-way outlet valve is connected to the pump chamber so as to allow pushing water or air out of the respective pump chamber by the piston.

Most preferably, an air inlet is arranged atop the float and connected to the pumping assembly. It is also preferable to guide said air and water from said pumping assembly to said first and/or second air chambers and said first and/or second water chambers through tubings.

In order to warrant for a smooth function of the system according to the invention, an air tank is interconnected between the pumping assembly and the first and/or second air chamber.

In a system according to the invention, preferably the energy from sea waves is converted to electric energy and also utilized to produce potable water using a desalination method; in this context it is noted that the production of potable water is not carried out by utilizing the electric energy generated by the device, for example, to power high pressure pumps that supply pressurized seawater to reverse-osmosis membranes, but instead pressurized seawater is provided to the reverse-osmosis assemblies. The reason for this is to avoid multiple energy conversion processes, which produces significant efficiency losses.

The efficiency by which the system according to the invention can convert sea wave power into electrical power and mechanical power—in the form of pressureized seawater—is high, which is mainly due to the simplicity of the system's construction and operation. This simplicity also renders the system exceptionally robust and cost-effective as regards construction costs, costs for maintenance and installation, etc. since it can be easily assembled and placed in the sea.

Another important advantage is that the system according to the invention can be adapted to varying requirements both as regards the generation of electrical power and the production of potable water. In this manner, it is suitable both for simple private use and for supplying large public needs.

All of the above is achieved without the slightest impact to the environment, since the system does not pollute in any way, and is noiseless and aesthetically pleasing. Still, it provides an alternative solution to the energy need of several countries, disburdening them from the combustion of fossil fuels, corresponding waste and $CO_2$ emission.

Further details of the present invention will become apparent by the following detailed description in combination with the attached drawings. The detailed description and the drawings merely show a preferred embodiment of the present invention and are not to be understood as narrowing the breadth of the scope of the claims or the invention.

Figure 1:
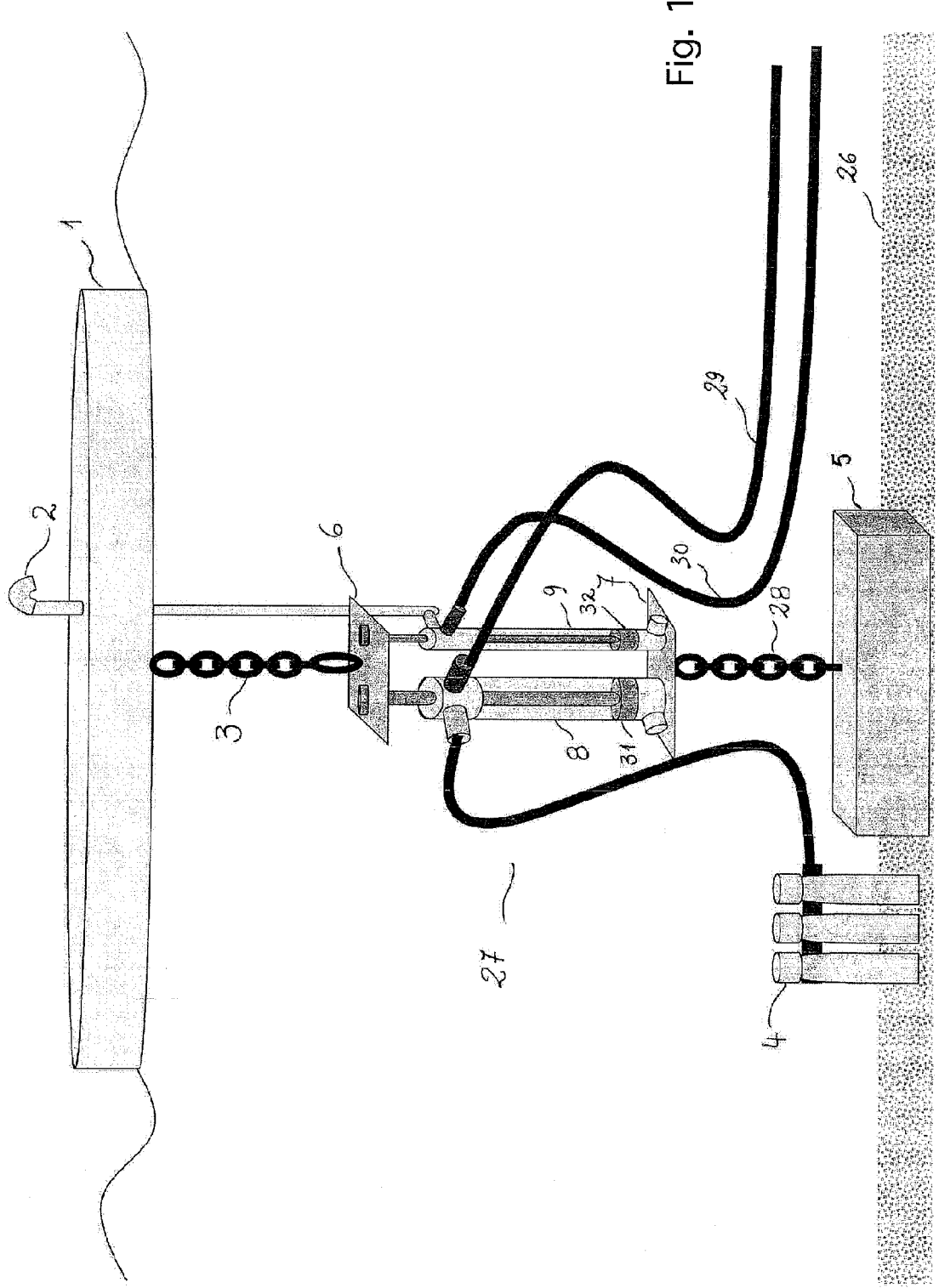
FIG. 1 shows a schematic drawing of the seaborne portion of the system according to the present invention including a float, a pumping mechanism and the anchoring of the device to the seabed.

The seaborne portion of the system according to the present invention as depicted in FIG. 1 comprises a float 1, having a cylindrical or elliptic shape in order to achieve the best possible flotation over sea waves. The float dimensions depend on the type, size and frequency of waves at the area selected for installation. Any alternative shapes of the float may be used depending on the specific use and area of use of the device.

Without imposing any restrictions, the float may be made of polyurethane, polyethylene, polyester, concrete, and in general of any suitable material for use as a flotation device with or without additional floating elements. To achieve better flotation, such additional floating elements may be mounted, for example, at the outer circumference of the float.

At the seabed 26 an anchor (mooring) 5 made of concrete or any other material suitable for anchoring the seaborne portion of the system firmly to the seabed is shown. Any other expedient method for anchoring the system may be used. In the embodiment depicted in FIG. 1 the weight of the anchor 5 is proportional to the buoyancy of the float and sufficient for restraining it without permitting drifting of the device in the sea. Specifically, the device anchoring is proportional to the maximum buoyancy of the float 1 when it momentarily becomes completely immersed in the water, and is calculated so that the overall system remains in a constant position.

Figure 2:
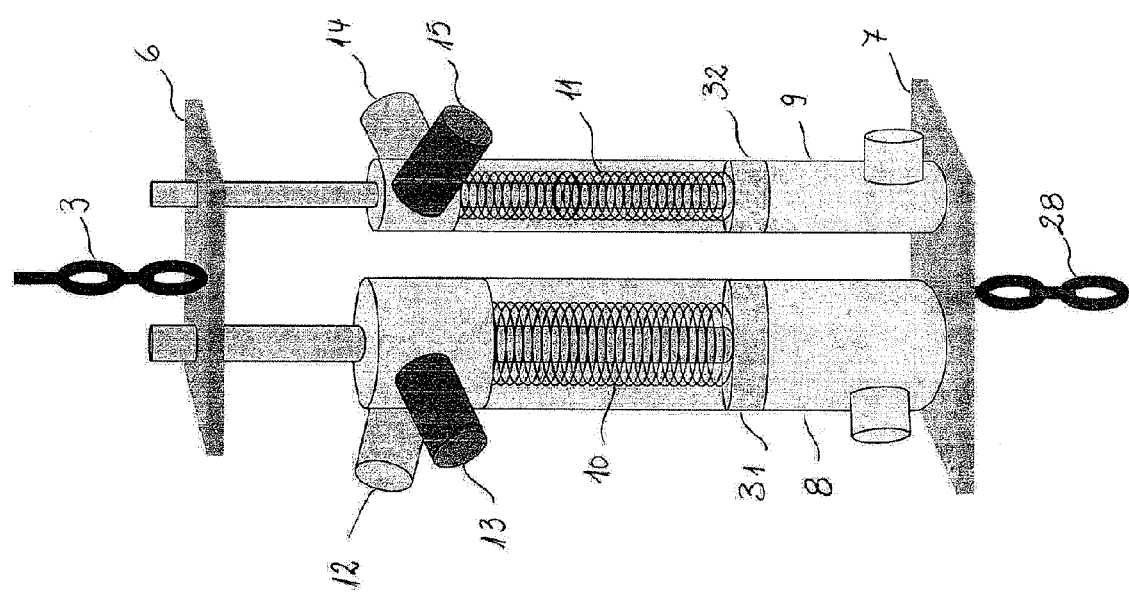
FIG. 2 shows a schematic drawing of the pumping mechanism of the seaborne portion of the system according to the invention.
Figure 3:
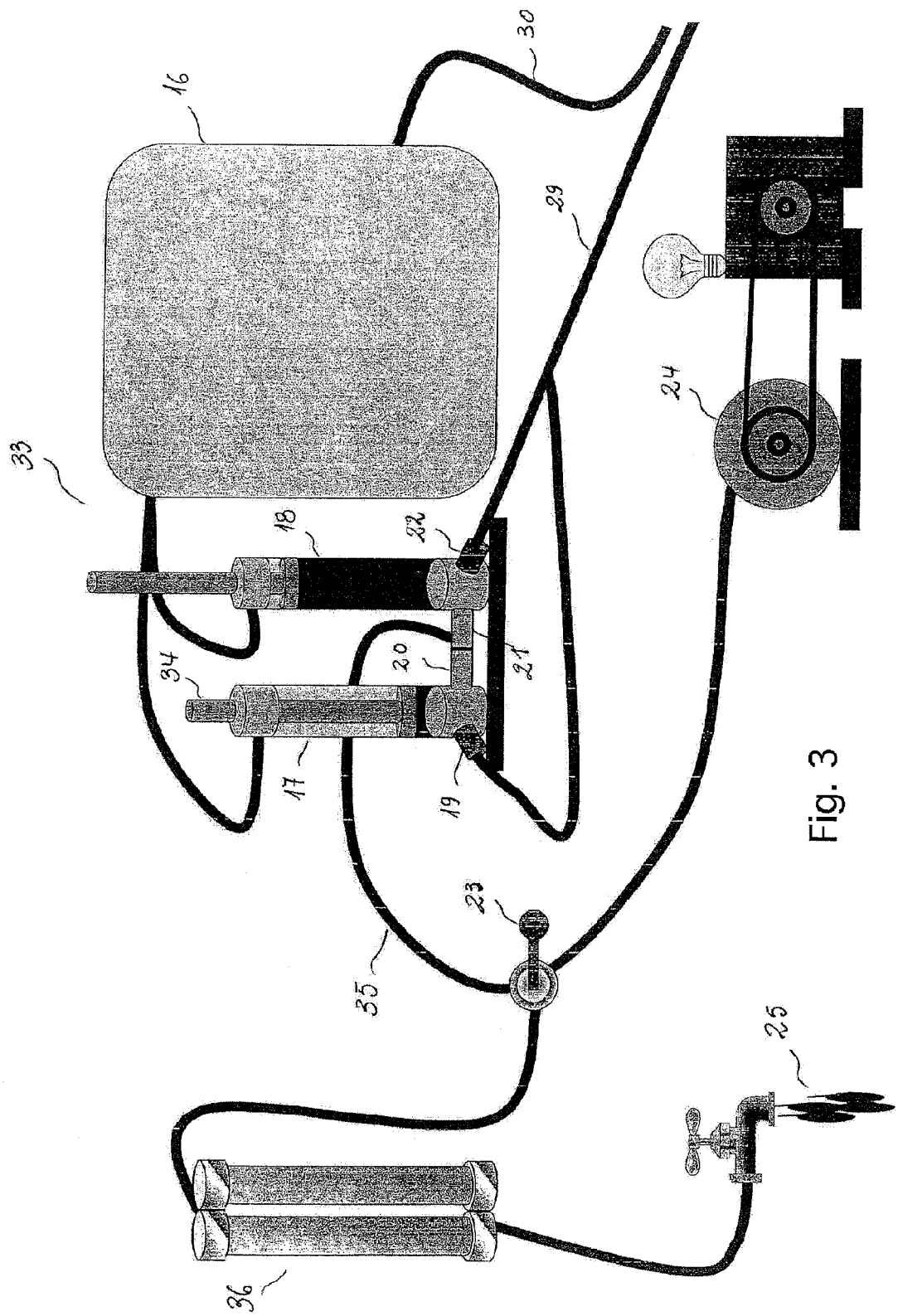
FIG. 3 shows a schematic drawing of the shore-side portion of the system according to the present invention, which is used for generation of electrical power and production of potable water.

As is apparent from FIG. 2, between the float 1 and anchor 5 a pumping mechanism 27 is provided comprising a first and a second closed cylinder 8 and 9. The bases of cylinders 8 and 9 are fixed on a lower metal plate 7 through which, via connecting chain 28, the cylinders are attached to the anchor 5. This warrants that the cylinders 8 and 9 are held at substantially the same level above the anchor 5 and/or the seabed 26.

Inside the first and second cylinder 8, 9 first and second pistons 31, 32 are arranged that are movable within the cylinders. The pistons are fixed to a metal plate 6 by connection rods. The metal plate 6 is attached, via connecting chain 3, to the float 1. This warrants that the metal plate 6 is held at substantially the same level beneath the float 5 and/or the surface.

As is apparent, connecting chains 3 and 28 may be embodied by any other means to connect the upper and lower metal plates 6 and 7 to the float 1 and the anchor 5, respectively, such as, for example, rods, wires, cables, ropes, combinations thereof and the like.

Also, it is within the scope of the invention that the connection of the metal plates 6 and 7 to the float and the anchor may be embodied using multiple of such connecting means or the like. In the case that the float is connected to the metal plate 6 by multiple connecting means that are affixed to the float at several off-center locations, it is preferred that the fixation means, such as, for example bolts, are tilted in the direction of the center of the upper metal plate 6 so as to provide a connection that has decreased or no transverse forces exerted thereon.

Also, as is similarly apparent, upper and lower metal plates 6, 7 may be embodied by any other means that firmly connect the first and second connection rods and the first and second cylinders 8, 9 to the connecting chains 28, 3. Such means could, for example, be rings, rods, combinations thereof and the like in any suitable arrangement.

First and second closed cylinders 8, 9 have attached at one side thereof, that is, the upper side or the lower side, at least one inlet and one outlet valve 12, 14 and 13, 15, respectively, which are configured as one-way valves so as to enable drawing a medium to be pumped into the cylinder 8, 9 upon movement of the piston in one direction and driving the said medium out of the cylinder 8, 9 upon movement of the piston in the other direction.

As the skilled person can take from the configuration shown in FIGS. 1 and 2, the pistons 31, 32 will conduct a reciprocating movement inside the cylinders 8, 9 if the float is moved up and down by sea waves. Thus, the principle of operation of this device relies on the vertical force exerted by the float 1 due to its buoyancy. Accordingly, while the float 1 is floating over the waves the system utilizes the force exerted by the float as it moves in the vertical direction.

In the embodiment shown in the drawings, an upwards motion of the float 1 causes the pistons 31, 32 of the first and second cylinder 8, 9 to draw in water and air, respectively, through inlet valves 12, 14 while a downwards motion of the float causes the pistons 31, 32 to drive out the water and air, respectively, through outlet valves 13, 15.

Depending on the arrangement of the inlet and outlet valves at the top or the bottom of the cylinders 8, 9 either the up or the down movement is partly or fully assisted by the recuperating springs. In the embodiment shown in the drawings, the recuperating springs 10, 11 will push down the pistons 31, 32 upon a down movement of the float 1, thereby assisting the drawing of water and air into the cylinders 8 and 9. The recuperating springs can be arranged to exert either a pushing or pulling force to assist the reciprocating motion of the pistons 31, 32.

The recuperating springs 10 and 11 are made of steel or any other suitable material and are calculated so that their coefficient is proportional to the size of the float. In a preferred embodiment, the recuperating springs are arranged inside the cylinder and wound around the connection rods of pistons 31 and 32. Alternatively recuperating springs 10 and 11 may be installed outside cylinders 8 and 9, for example, between upper and lower plates 6 and 7 and may be supported by these plates. Also, it may be advantageous to arrange the recuperating springs on the side of the pistons 31, 32 opposite the connection rods inside the cylinders 8, 9.

Inlet valves 12, 14 are connected to a seawater inlet and an air inlet 2, respectively, whereby the seawater inlet may include a seawater filter 4 so as to reduce the possibility of sand, dust or debris entering the first cylinder, thereby possibly damaging any elements of the system. The air inlet 2 is connected to the inlet valve 14 of the second cylinder 9 preferably by flexible tubing so as to prevent damages to the system upon a relative movement between the float and the upper portions of the first and second cylinders 8, 9.

Outlet valves 13, 15 are connected to pressure tubes 29, 30 that directly or indirectly connect the seaborne portion of the system according to the invention to the shore-side portion, thereby delivering pressurized water and air to the shore side portion.

Accordingly, first cylinder 8, with the aid of one-way valves 12 and 13, draws in and pressurizes seawater through tubing 29 towards the shore as its piston 31 reciprocates, while cylinder 9, with the aid of its one-way valves 14 and 15 draws and pressurizes air as its piston 32 reciprocates, which, through tubing 30 is supplied to the shore side-portion of the system.

Seawater filter 4 may be formed by a filter cluster, the purpose of which is to completely prevent sand and various other particles from entering the device, thus more reliably protecting its various seaborne or shore-side components. Preferably, air inlet 2 also comprises a filter so as to prevent drawing in dust or other material that may be undesired to have in the system.

The pressure exerted by the pistons 31, 32 is proportional to the force exerted by the float 1 due to its buoyancy and inversely proportional to the surface of the pistons 31, 32. On the basis thereof, the proper combination of piston cross section and float buoyancy is selected so that the water reaches the shore with the desired pressure. Also, it is preferable that the cylinders 8 and 9 as well as corresponding pistons 31, 32 are of different cross sections in order to provide for defined pressures of the seawater and the air at the shore-side portion of the system. Preferably, the pressure at the shore-side portion of the system is larger than the pressure of the pressurized seawater, most preferably a little larger than the pressure of the pressurized seawater.

The one-way valves 12 to 15 of the cylinders 8 and 9 play a significant role for the proper operation of the system. In order to provide a redundant function of the system, several one-way valves may be arranged in a serial manner within the seawater and air intake manifold or the seawater and air outlet manifold, that is the tubing 29 and 30 or any intermediate components As the piston 31 of the first cylinder 8 moves upwards, the inlet valve 12 closes and the outlet valve 13 opens, thus pushing the water towards the tubing 29. The second cylinder 9 operates similarly, however, as described, air is pushed towards the tubing 30.

The pressurized water and air is transferred through tubes 29 and 30 ashore, and more precisely to the compression system 33 and air tank 16, respectively. Both are used to create a constant pressure water flow towards the next stage, which may be either the desalination assembly or the electrical generator or both.

Compression system 33 comprises third and fourth closed cylinders 17 and 18. Inside cylinders 17 and 18 third and fourth movable pistons are located that seal upper portions of the cylinder chambers from lower portions of the cylinder chambers. The upper portions of third and fourth cylinders 17,18 are connected to air tank 16, while the lower portions are connected through inlet valves 19, 22 to the tube 29 coming from the seaborne portion of the system according to the invention. The lower portions of cylinders 17 and 18 are also connected through outlet valves 20 and 21 to outlet tube 35 leading to the downstream stage of the system.

In the case when the air pressure in the upper portions of cylinders 17 or 18 exceeds the water pressure in the lower portions of cylinders 17 or 18, respectively, the respective one of the third and fourth movable piston will move downwards. Likewise, in the case when the water pressure in the lower portions of cylinders 17 or 18 exceeds the air pressure in the upper portions of cylinders 17 or 18, respectively, the respective one of the third and fourth movable piston will move upwards.

Preferably, valves 19 to 22 are solenoid valves that are operated by a control assembly (not shown). Alternatively, valves 19 to 22 may also be of a controllable mechanical type or any other suitable valve type, that allows exerting control over the in- and outflow of pressurized seawater to the lower portions of cylinders 17 and 18.

In a first operational cycle, inlet valve 19 and outlet valve 21 are open and inlet valve 22 and outlet valve 20 are closed. During the first cycle, pressurized seawater is supplied to the lower portion of cylinder 17, the water driving up the third piston as the pressure of the seawater exceeds this of the pressurized air in tank 16 and correspondingly the upper portion of cylinder 17. As the third piston of the third cylinder 17 approaches its topmost position, a switch (not shown) is activated, for example a mechanical, electrical or optical switch, that changes the valves' states to a second operational cycle.

During the second cycle, inlet valve 22 and outlet valve 20 are open and inlet valve 19 and outlet valve 21 are closed. Pressurized seawater is supplied to the lower portion of cylinder 18, the water driving up the fourth piston as the pressure of the seawater exceeds this of the pressurized air in tank 16 and correspondingly the upper portion of cylinder 18. As the fourth piston of the fourth cylinder 17 approaches its topmost position, a switch is activated, for example a mechanical, electrical or optical switch (not shown), that changes the valves' states back to the first cycle.

As is the case in the topmost positions of the third an fourth pistons, preferably, also in the lowest position of the third and fourth pistons a switch (not shown) may be activated, either mechanically, electrically or optically, that may change the valves' states to one or the other cycle.

During the first and second cycles, when an inlet valve 19, 22 of a cylinder is closed and an outlet valve 20, 21 of the same cylinder is opened the air pressure in the upper portion of the respective cylinder exceeds the seawater pressure in the lower portion of this cylinder and thereby drives down the piston. Due to the substantially constant air pressure in air tank 16 that effects the downwards movement of the pistons and the large supply of pressurized air in air tank 16, the draining of a cylinder towards the outlet tube 35 happens at a substantially constant rate and/or pressure that closely matches the air pressure in tank 16.

The air tank 16 connected to the top of cylinders 17 and 18 is also used to minimize any pressure fluctuations as the third and fourth pistons compress the air alternating while moving upwards, thus keeping pressure substantially constant. Also, the air tank 16 provides a substantially constant air pressure even in the case that leaks may occur over time.

Downstream the compressor 33, connected to the outlet tube 35 is a switch by which the pressurized seawater may be guided to a desalination assembly 36 to produce potable water 25, for example by using the reverse-osmosis method, and/or a water-motor 24 driving a generator that provides electricity. Alternatively, instead of the water-motor/generator combination also a water-driven generator may be used to produce electricity. The selection by switch 23 can be made manually or automatically by a control system depending on the requirements.

The invention claimed is:

1. A system for producing a flow of water having a substantially constant pressure from waves, the system comprising:
   at least one pumping assembly being adapted to provide simultaneously a pressurized flow of air and a pressurized flow of water from substantially vertical movements of a float;
   at least one compressor assembly in which at least a first piston is movably located between a first air chamber and a first water chamber, said first air chamber being supplied by said pressurized flow of air from the pumping device and said first water chamber being supplied by said pressurized flow of water from the pumping device;
   a first controllable inlet valve, which is connected to said first water chamber and through which said pressurized water flows into said first water chamber upon opening of said first inlet valve and wherein said first inlet valve is closed as the first piston reaches a topmost position.

2. A system according to claim 1, wherein the compressor assembly further comprises a second piston movably located between a second air chamber and a second water chambers, said second air chamber being supplied by said pressurized flow of air from the pumping device and said second water chamber being supplied by said pressurized flow of water from the pumping device and wherein a second controllable inlet valve is connected to said second water chamber through which said pressurized water flows into said second water chamber upon opening of said second inlet valve and wherein said second inlet valve is closed as the second piston reaches a topmost position.

3. A system according to claim 1, wherein said first or second inlet valves are opened as the first or second pistons reach a lowest position, respectively.

4. A system according to claim 1, wherein said second or first inlet valves are opened as the first or second pistons reach a topmost position, respectively.

5. A system according to claim 1, wherein said second or first inlet valves are closed as the first or second pistons reach a lowest position, respectively.

6. A system according to claim 1, wherein a controllable first outlet valve is connected to said first water chamber, and wherein water flows out of said first water chamber upon opening of said first outlet valve said first outlet valve being opened as the first piston reaches a topmost position.

7. A system according to claim 1, wherein a controllable second outlet valve is connected to said second water chamber, and wherein water flows out of said second water chamber upon opening of said second outlet valve said second outlet valve being opened as the second piston reaches a topmost position.

8. A system according to claim 6, wherein said first or second outlet valves are closed as the first or second pistons reach a lowest position.

9. A system according to claim 6, wherein said second or first outlet valves are opened as the first or second pistons reach a lowest position, respectively.

10. A system according to claim 6,
    wherein said second or first outlet valves are closed as the first or second pistons reach a topmost position, respectively.

11. A system according to claim 1, wherein the pumping assembly is immersed in water and held in position by an anchor.

12. A system according to claim 11, wherein the pumping assembly is floating at a defined depth between an anchor and said float.

13. A system according to claim 1, wherein the pumping assembly comprises first and second pumping pistons movable inside first and second cylinders and wherein the pumping pistons are attached to the float and the cylinders are attached to the anchor.

14. A system according to claim 13, wherein the first pumping piston, upon its reciprocating motion, draws water in and pushes water out of a pump chamber inside the first cylinder.

15. A system according to claim 13, wherein the second pumping piston, upon its reciprocating motion, draws air in and pushes air out of a pump chamber inside the second cylinder.

16. A system according to claim 13, wherein at least one recuperating spring is provided so as to partially or fully support at least one direction of movement of said pumping piston.

17. A system according to claim 13, wherein at least one one-way inlet valve is connected to the pump chamber of said cylinder so as to allow drawing water or air into the respective pump chamber by the piston.

18. A system according to claim 13, wherein at least one one-way outlet valve is connected to the pump chamber so as to allow pushing water or air out of the respective pump chamber by the piston.

19. A system according to claim 13, wherein an air inlet is arranged atop the float and connected to the pumping assembly.

20. A system according to claim 13, wherein said air and water is supplied by said pumping assembly to said first and/or second air chambers and said first and/or second water chambers through tubings.

21. A system according to claim 13, wherein an air tank is interconnected between the pumping assembly and the first and/or second air chamber.

22. Use of a system for producing a flow of water having a substantially constant pressure from waves according to claim 1 to provide seawater of constant pressure for a desalination process.

23. Use of a system for producing a flow of water having a substantially constant pressure from waves according to claim 1 to provide water of constant pressure to a water-driven motor or generator.

* * * * *